UNITED STATES PATENT OFFICE.

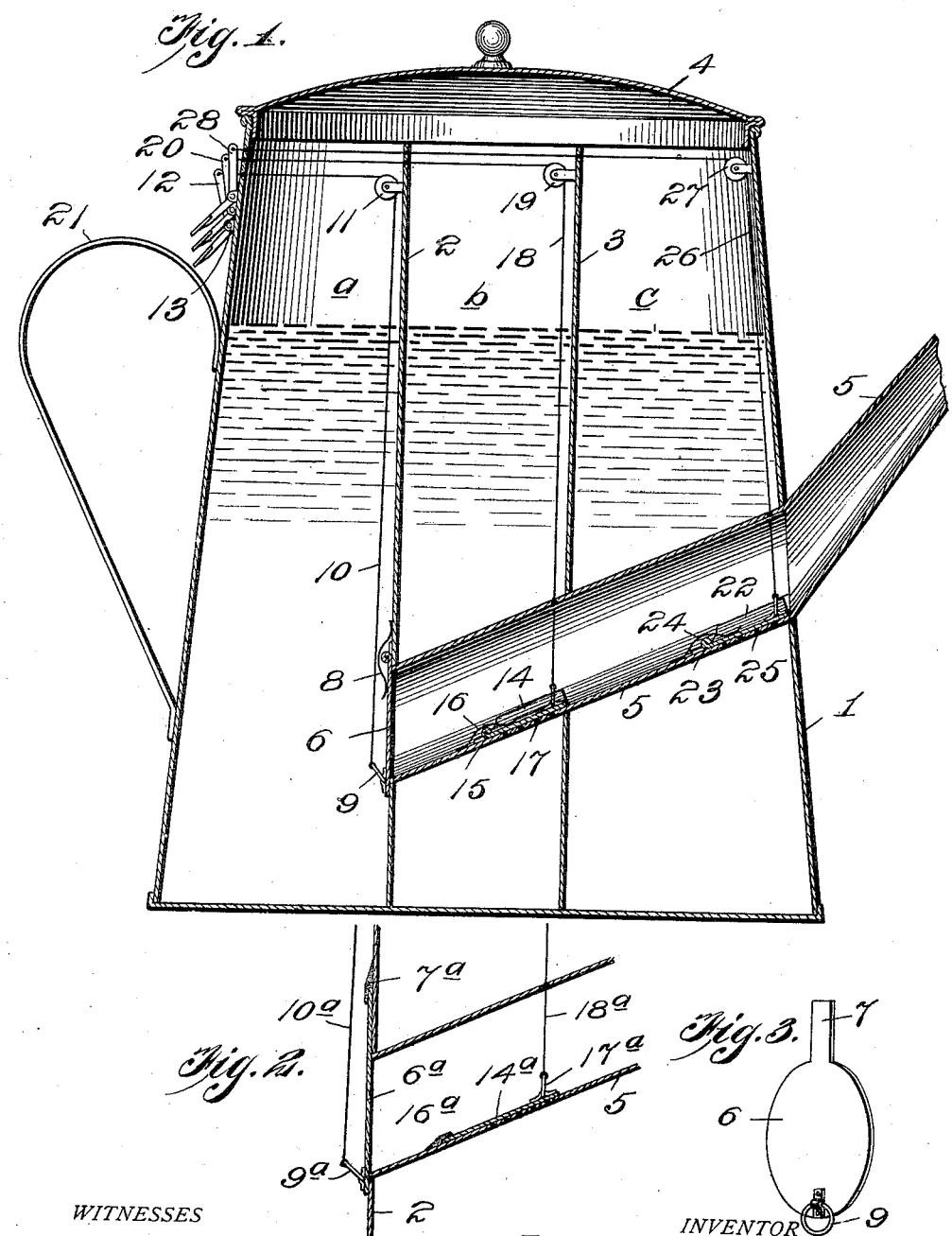

JOSEPH NICHOLAS PAPENDRY, OF EAST LIVERPOOL, OHIO.

COMBINATION-POT.

994,949.  Specification of Letters Patent.  Patented June 13, 1911.

Application filed February 16, 1911. Serial No. 609,050.

*To all whom it may concern:*

Be it known that I, JOSEPH N. PAPENDRY, a citizen of the United States, residing at East Liverpool, in the county of Columbiana and State of Ohio, have invented certain new and useful Improvements in Combination-Pots, of which the following is a specification.

This invention relates to combination pots designed for the purpose of dispensing various beverages such as tea, coffee, cocoa, etc., and one of the principal objects of the invention is to provide a receiver for the various beverages provided with partitions and a spout extending through the side of the receiver and through the partitions, said spout having valves therein which communicate with the various compartments so that any of the beverages may be dispensed from the receiver at will.

Another object of the invention is to provide a dispensing device for beverages to be used in hotels, public restaurants, or in the household for dispensing various beverages from a single receiver or vessel.

In hotels and restaurants where a large number of persons are to be served with tea, coffee, cocoa or other drinkables, it is found very inconvenient to have a dispensing vessel for each particular beverage, and it is one of the principal objects of my invention to have a single dispensing vessel from which a number of beverages may be drawn, thus facilitating the service and leading to a great saving of time.

The objects and advantages herein referred to may be attained by means of the construction illustrated in the accompanying drawing in which:—

Figure 1 is a vertical sectional view taken through the combination dispensing vessel made in accordance with my invention; Fig. 2 is a detail sectional view of the inner end of the discharge spout with two of the valves shown in section, said valves being modified forms; Fig. 3 is a detail perspective view of one of the valves disconnected from the dispensing vessel.

Referring to the drawings, the numeral 1 designates a dispensing vessel or pot for beverages which may be of any desired shape and size, depending upon the character of the beverages to be dispensed and the number of persons to be served. The vessel 1 is shown provided with two partitions, 2 and 3, extending across upon the inside of the vessel, and properly secured in place to form air-tight joints with the wall of said vessel. A suitable cover 4 may be provided for the vessel or dispenser. Thus the vessel or dispenser is provided with three separate compartments designated $a$, $b$ and $c$, designed to contain, as an illustration, coffee in the compartment $a$, tea in the compartment $b$, and cocoa in the compartment $c$. Extending through the side of the vessel $a$ is a discharge spout 5, said spout extending through the partitions 2 and 3 and terminating at the partition 2 as shown in Figs. 1 and 2 of the drawing.

Hinged to the partition 2 is a flat metal valve 6 provided with an extended tongue 7 which forms a hinge. Connected to the partition 2 is a spring 8 and its free end bears upon the valve 6 and holds it closed against the end of the discharge spout 5. A ring 9 is connected to the valve 6, and attached to the ring 9 is a fine wire 10, said wire leading up at the side of the partition 2 over a grooved pulley 11 and thence upward through the side of the vessel 1 where the terminal end is connected to a suitable lever 12 pivoted to a lug 13 at the side near the top of the vessel 1.

Within the discharge spout 5 and in vertical alinement with the compartment $b$ is a curved valve 14 also provided with a hinge 15 and a spring 16 to hold the valve closed. Underneath the valve in the spout 5 is a suitable strainer or series of perforations 17. A small wire 18 is connected to the valve 14 and extends over a grooved pulley 19 secured to the partition 3, said wire extending out through the side of the vessel and connected to a lever 20 pivoted to the side of the vessel immediately above the handle 21. A similar valve 22 is hinged at 23 in the discharge spout 5 within the compartment $c$, said valve also having a spring 24 which holds the valve closed upon the strainer 25 in the spout 5. A similar wire 26 is connected to this valve and leads over a pulley 27 and thence out through the side of the vessel to a lever 28.

As shown in Fig. 2 the valve $6^a$ is connected to the partition 2 by means of an elastic metal hinge $7^a$, said hinge serving to hold the valve closed against the end of the spout 5. A ring $9^a$ is connected to the valve and a small wire $10^a$ is attached to the ring, said wire leading up to a grooved pulley and to a lever similar to that shown in Fig. 1 of the drawing. The valve 14ª in the discharge spout may be of similar construction to that shown in Fig. 1 except that it is secured to the inside of the spout 5 by means of an elastic metal hinge 16ª. Connected to a ring 17ª secured to the valve 14ª is a wire 18ª which leads to a lever similar to those shown in Fig. 1 of the drawing.

The operation of my invention may be briefly described as follows:—If coffee from the compartment a is to be served through the discharge spout 5, the lever 12 is operated to open the valve 6 and permit the coffee to pass through the spout 5 and into the cup. If it is desired to dispense tea from the compartment b, the valve 20 is operated to raise the valve 14, the other valves being closed by means of the spring. If cocoa is to be dispensed, the valve 22 is raised by means of the lever 28.

From the foregoing it will be obvious that my invention is comparatively simple in construction, can be manufactured at low cost and will dispense various beverages from a single receptacle or vessel.

I claim:—

1. A dispensing vessel for beverages provided with vertically disposed partitions forming compartments for different beverages, a spout extending into the vessel and through said partitions, said spout having openings into each of said compartments, a valve for closing each of said openings, wires leading from the valves and over pulleys, and pivoted levers to which said wires are connected, said levers being disposed near the handle of the vessel.

2. A dispensing vessel for beverages comprising a receptacle having vertical partitions therein forming a plurality of compartments, a discharge spout extending through the wall of the receptacle and through said partitions, said discharge spout having openings therein which communicate with each of the compartments, spring seated valves for closing said openings, a flexible connection attached to each of said valves and passing over pulleys, said flexible connections being attached to pivoted levers upon the outer wall of said receptacle near the handle, said spout having an opening at its inner end, a spring seated valve for closing said opening, and a flexible connection attached to said valve and passing over a pulley, said connection being attached to a lever pivoted near the handle, whereby each of said valves may be independently operated for dispensing liquids from any of said compartments.

3. A dispenser for beverages comprising a receptacle having various compartments therein, a spout leading into said compartments, and provided with openings communicating with each of said compartments, a spring seated valve for covering said openings, wires connected to said valves, pulleys over which said wires lead out through the receptacle, and means whereby said valves may be independently operated for dispensing different beverages from the receptacle.

In testimony whereof I affix my signature in presence of two witnesses.

JOSEPH NICHOLAS PAPENDRY.

Witnesses:
JAMES E. DAVIS,
J. C. CARNAHAN.

---

Copies of this patent may be obtained for five cents each, by addressing the "Commissioner of Patents, Washington, D. C."